United States Patent [19]

Lenting

[11] Patent Number: 5,486,050
[45] Date of Patent: Jan. 23, 1996

[54] KITCHEN MACHINE COMPRISING A LID LOCK WITH A CENTRIFUGAL MEMBER

[75] Inventor: Gerard J. Lenting, Drachten, Netherlands

[73] Assignee: U.S. Philips Corporation, New York, N.Y.

[21] Appl. No.: 284,968

[22] Filed: Aug. 2, 1994

[30] Foreign Application Priority Data

Aug. 4, 1993 [BE] Belgium .............................. 09300811

[51] Int. Cl.$^6$ ........................................................ B01F 7/16
[52] U.S. Cl. .................. 366/314; 241/37.5; 241/199.12; 366/347
[58] Field of Search ..................... 366/348, 349, 366/347, 314, 325–330, 279, 205; 99/348; 494/60, 61; 241/37.5, 199.12

[56] References Cited

U.S. PATENT DOCUMENTS

| 4,614,306 | 9/1986 | Doggett | 241/37.5 |
|---|---|---|---|
| 4,629,131 | 12/1986 | Podell | 241/37.5 |
| 4,741,482 | 5/1988 | Coggiola | 241/37.5 |
| 4,799,626 | 1/1989 | Hickel | 241/37.5 |
| 5,071,077 | 12/1991 | Arroubi | 366/347 |
| 5,245,260 | 9/1993 | Duipmans | 318/446 |

FOREIGN PATENT DOCUMENTS 0158032 10/1985 European Pat. Off. .

*Primary Examiner*—Robert W. Jenkins
*Attorney, Agent, or Firm*—Ernestine C. Bartlett

[57] ABSTRACT

A kitchen machine with a housing (1) and a bowl (9) which can be placed on the housing (1) and can be closed with a lid (33). A rotary tool (27) can be placed in the bowl (9) and can be driven by means of an electric motor (21) arranged in the housing (1). The kitchen machine is provided with a locking device (63) which locks the lid (33) during rotation of the tool (27) in order to prevent that a user of the kitchen machine can injure himself with the rotating tool (27).

The locking device comprises a centrifugal member (65, 111) which cooperates with a safety member (105). The use of the centrifugal member (65, 111) achieves that the lid (33) is not released by the safety member (105) after switching-off of the electric motor (21) until the moment the tool (27) has come substantially to a standstill. It is prevented in this way that the user can injure himself with the tool (27) still running out under the influence of its mass inertia after switching-off of the electric motor (21).

11 Claims, 4 Drawing Sheets

KITCHEN MACHINE COMPRISING A LID LOCK WITH A CENTRIFUGAL MEMBER

FIELD OF THE INVENTION

The invention relates to a kitchen machine with a housing and a bowl which can be placed on the housing and can be closed by means of a lid, while a rotatable tool can be placed in the bowl and driven by means of an electric motor arranged in the housing, the kitchen machine being provided with a locking device for locking the lid during rotation of the tool.

BACKGROUND OF THE INVENTION

A kitchen machine of the kind mentioned in the opening paragraph is known from European Patent 0 158 032 and comprises a locking device which is mechanically coupled to a switch button for operating the electric motor. The locking device comprises a bush which is journalled in the housing of the kitchen machine and is provided with two incisions made substantially diagonally opposite one another. The bush is provided with a concentric disc which has a number of teeth near a circumference. The switch button is also journalled in the housing and is provided with a C-shaped rim at a lower side. When the bowl with the lid are not placed on the housing correctly, the bush will be in such a position that the C-shaped rim of the switch button hits against the bush upon rotation of the switch button, and the electric motor cannot be switched on. It is prevented in this manner that the electric motor can be switched on while the bowl and the lid are not positioned correctly on the housing.

The lid of the bowl comprises a tongue which is also provided with a number of teeth near a circumference. If the bowl with the lid is placed correctly on the housing, the tongue is rotated into a recess of the housing, whereby the teeth of the tongue engage with the teeth of the bush, and the bush is rotated into a position in which the incisions of the bush are present opposite the ends of the C-shaped edge of the switch button. The electric motor can now be switched on by rotation of the switch button, the C-shaped rim entering the incisions of the bush. After rotation of the switch button, the bush cannot be rotated anymore, so that the lid of the bowl is locked. It is prevented thereby that the lid can be removed during rotation of the electric motor and that the user can injure himself with the rotating tool.

A disadvantage of the known kitchen machine is that the lid of the bowl is released already by the locking device the moment the electric motor is switched off with the switch button. The user of the kitchen machine may thus remove the lid from the bowl immediately after switching-off of the electric motor. The user can still injure himself with the tool then, because the electric motor and the tool driven thereby continue rotating for a short time after switching-off of the electric motor, which time depends on the mass inertia moments of the electric motor and the tool and the frictional forces experienced by the electric motor and the tool.

SUMMARY OF THE INVENTION

It is an object of the invention to provide a kitchen machine of the kind mentioned in the opening paragraph in which the removal of the lid after switching-off of the electric motor is substantially impossible while the tool is still rotating.

The invention is for this purpose characterized in that the locking device is provided with a centrifugal member which is rotatably coupled to a shaft which is drivable by the electric motor and which is movable from a first into a second position under the influence of a rotation of said drivable shaft, and with a safety member which cooperates with the lid and with the centrifugal member, the safety member releasing the lid in the first position of the centrifugal member and locking the lid in the second position of the centrifugal member. When the drivable shaft is stationary, the centrifugal member is in the first position and the lid is not locked by the safety member. When the shaft is driven by the electric motor, the centrifugal member is taken along in rotation by the shaft, so that the centrifugal member experiences a centrifugal force. Under the influence of the centrifugal force, the centrifugal member is displaced from the first into the second position, whereby the safety member cooperating with the centrifugal member locks the lid. During running-out of the electric motor and the tool after switching-off of the electric motor, the centrifugal member initially remains in the second position under the influence of the centrifugal force, so that the lid remains locked. The centrifugal member does not return to the first position until the electric motor and the tool have come to a substantially complete standstill, whereupon the safety member releases the lid. It is thus not possible to remove the lid from the bowl until the tool has become substantially stationary, so that injuries caused by the rotating tool may be considered out of the question.

A special embodiment of a kitchen machine according to the invention is characterized in that the drivable shaft to which the centrifugal member is coupled is a motor shaft of the electric motor. Since the electric motor usually has a higher speed than the tool, the centrifugal member coupled to the motor shaft experiences a comparatively great centrifugal force, so that the operation of the locking device is very effective.

A further embodiment of a kitchen machine according to the invention, in which the centrifugal member is of a particularly simple construction, is characterized in that the drivable shaft extends in vertical direction, while the centrifugal member is provided with a ball which is guided by a guide fastened to the drivable shaft and extending obliquely relative to the drivable shaft with a positive angle of inclination, and is provided with a slide cooperating with the safety member, resting on the ball and guided so as to be displaceable parallel to the drivable shaft. When the shaft is driven by the electric motor, the ball is guided upwards away from the drivable shaft along the guide against a stop under the influence of the centrifugal force and against the force of gravity. The slide, which cooperates with the safety member, is forced up along the drivable shaft by the ball during this. After the electric motor has been switched off, the ball initially still rests against the stop during the run-out of the electric motor. The ball does not return to the drivable shaft under the influence of gravity until the moment the drivable shaft is substantially stationary, whereupon the slide resting on the ball slides down under the influence of gravity and the lid is released by the safety member.

A yet further embodiment of a kitchen machine according to the invention is characterized in that the centrifugal member comprises three balls which are each guided in an individual guide, while the guides enclose angles of substantially 120° with one another. The use of the three balls causes a strong locking force of the safety member and ensures that the centrifugal member causes substantially no vibrations of the drivable shaft during rotation.

A special embodiment of a kitchen machine according to the invention is characterized in that the angle of inclination of the guides is substantially 30°. The use of the angle of inclination of substantially 30° achieves that the ball does not return to the first position after switching-off of the electric motor until the moment the drivable shaft is substantially stationary, while at the same time a strong locking force and a sufficient displacement of the slide can be achieved.

A further embodiment of a kitchen machine according to the invention, which provides a practical and simple coupling between the safety member and the slide, is characterized in that the locking device is provided with a pivot arm which near one of its two ends is fastened to a coupling shaft extending transversely to the drivable shaft and journalled in the housing and near its other end rests on the slide, while the safety member is displaceable in a direction transverse to the drivable shaft and transverse to the coupling shaft and is provided with a slot which extends parallel to the drivable shaft and is in engagement with a pin fastened on a side arm of the coupling shaft.

A yet further embodiment of a kitchen machine according to the invention, in which it is achieved that there is only a slight friction between the slide and the pivot arm resting on the slide, is characterized in that the pivot arm rests on a support bail of the slide.

BRIEF DESCRIPTION OF THE DRAWINGS

The invention will be explained in more detail below with reference to the drawing, in which.

DETAILED DESCRIPTION OF PREFERRED EMBODIMENTS

Figure 1:
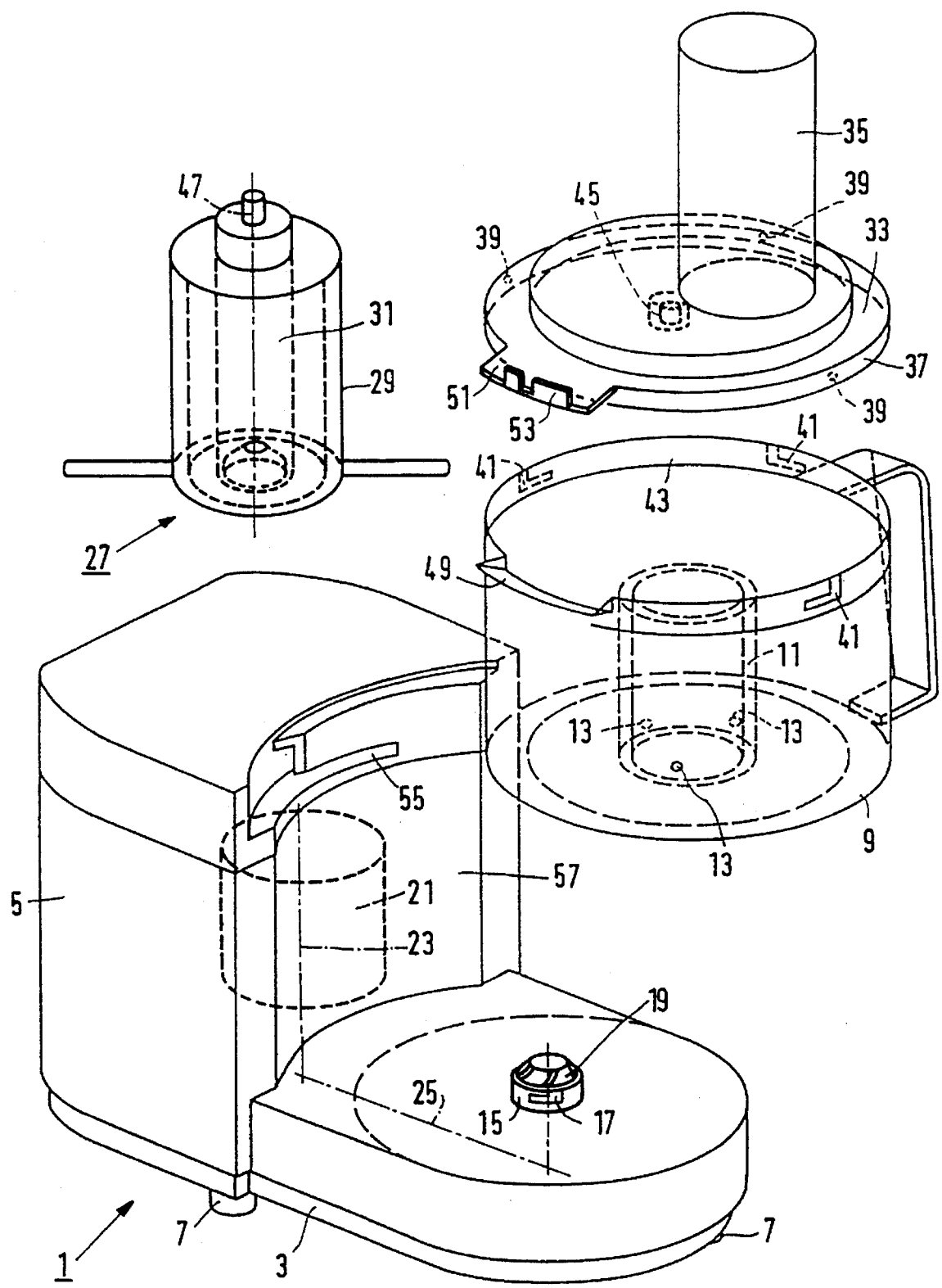
FIG. 1 shows a kitchen machine according to the invention.

The kitchen machine shown in FIG. 1 is provided with a synthetic-resin housing 1 which comprises a base 3 and a motor housing 5. The base 3 is provided with a number of feet 7 with which the kitchen machine can be placed on a horizontal surface. Next to the motor housing 5, a transparent bowl 9 made of glass or synthetic resin can be placed on the base 3. The bowl 9 comprises a central tube 11 which is open at both ends and which is provided with a number of pins 13 at an inner side. The tube 11 can be arranged around an annular vertical rim 15 of the base 3, whereupon the bowl 9 can be locked to the base 3 in vertical direction by means of a bayonet closure. The bowl 9 is so rotated for this purpose that the pins 13 enter slots 17 of the vertical rim 15 cooperating with the pins 13.

A coupling bush 19 is journalled in the vertical rim 15 of the base 3. The coupling bush 19 is drivable by an electric motor 21 which is arranged in the motor housing 5, which has a motor shaft 23 arranged vertically, and which is coupled to the coupling bush 19 via a transmission 25 present in the base 3 such as, for example, a usual belt or gear transmission. The electric motor 21, the motor shaft 23 and the transmission 25 are depicted diagrammatically only in FIG. 1. A tool 27 can be placed in the bowl 9, such as, for example, a cutting tool shown in FIG. 1. The tool 27 comprises a bush 29 which can be arranged around the central tube 11 of the bowl 9, and a shaft 31 arranged concentrically inside the bush 29, which comes into engagement with the coupling bush 19 when the tool 27 is placed around the tube 11. The tool 27 is thus journalled around the tube 11 and can be driven by the electric motor 21.

As is further shown in FIG. 1, the bowl 9 can be closed by a lid 33 which is provided with a feed chute 35. The width and the height of the feed chute 35 are such that a user of the kitchen machine cannot injure himself with the rotating tool 27 through the feed chute 35. The lid 33 comprises a rim 37 which is provided with a number of pins 39 at an inner side. The lid 33 can be locked to the bowl 9 in vertical direction by means of a bayonet closure. The lid 33 is so rotated for this purpose that the pins 39 enter slots 41 of an upper rim 43 of the bowl 9 which cooperate with the pins 39. The lid 33 is further provided, at a lower side, with a bearing bush 45 for the rotatable support of a journal 47 provided at an upper side of the tool 27.

FIG. 1 further shows that the bowl 9 is provided with a spout 49, while the lid 33 is provided with a lip 51 which covers the spout 49 when the lid 33 is locked to the bowl 9 by means of the bayonet closure 39, 41. The lip 51 has a vertical rim 53. When the bowl 9 closed with the lid 33 is positioned and locked on the base 3, in which case the bowl 9 is rotated around the vertical rim 15 of the base 3, the spout 49 of the bowl 9 and the lip 51 of the lid 33 slide into a slotted recess 55 in a side wall 57 of the motor housing 5.

Figure 2:
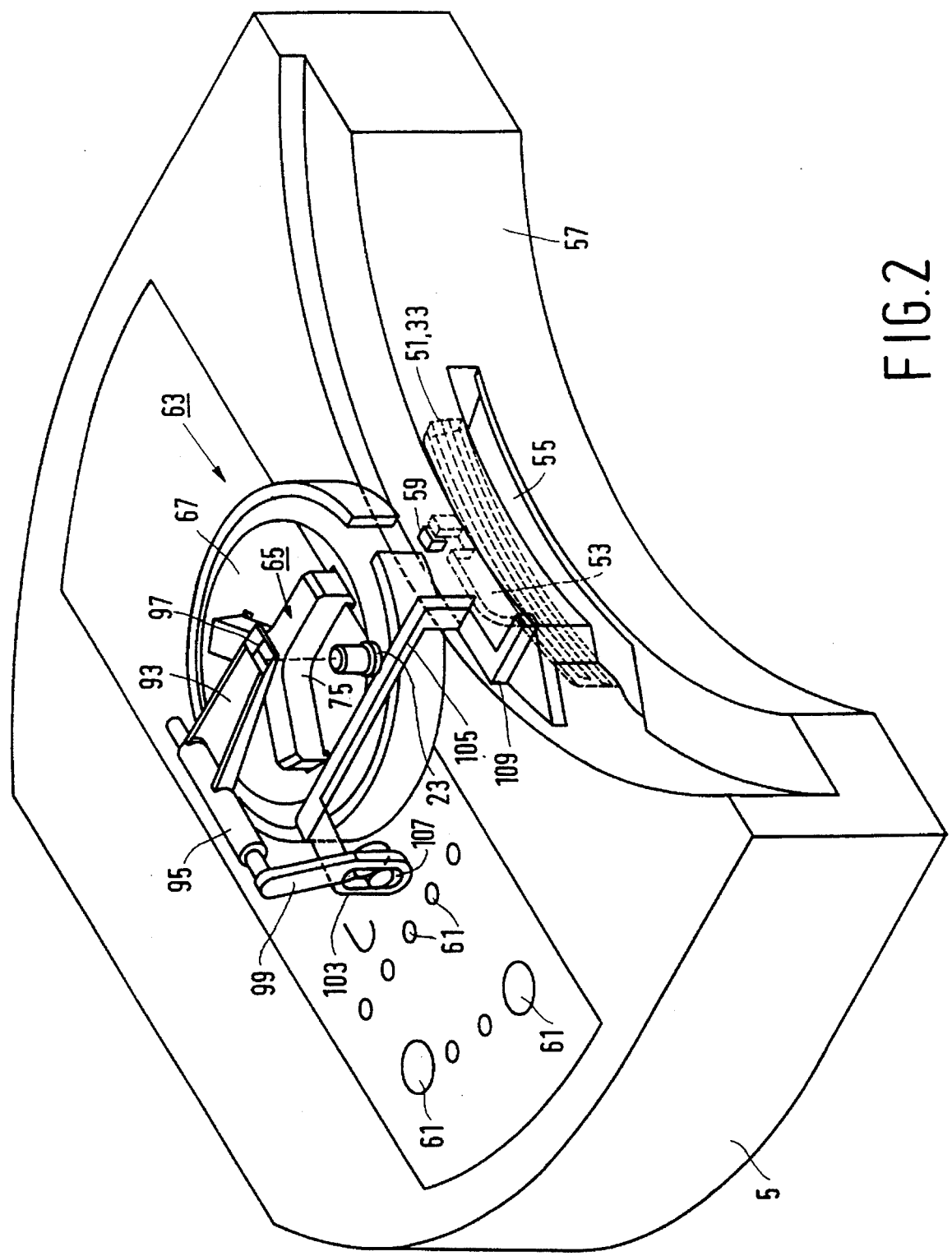
FIG. 2 shows a locking device of the kitchen machine according to FIG. 1.

FIG. 2 shows an upper portion of the motor housing 5 in which the slotted recess 55 is present. FIG. 2 further shows the lip 51 of the lid 33 with a broken line in a position in which the bowl 9 is locked to the base 3 by means of the bayonet closure 13, 17 and the lid 33 is locked to the bowl 9 by means of the bayonet closure 39, 41. In this position, the vertical rim 53 of the lip 51 activates an electric switch 59 which is fastened in the motor housing 5 near the slotted recess 55 and which forms part of an electric circuit, not shown in FIG. 2 and known per se, for the supply of the electric motor 21. Furthermore, a number of electronic contact switches 61 for operating the electric motor 21 form part of the electric circuit. The electric circuit is so designed that the electric motor 21 can be switched on with the switches 61 exclusively when the electric switch 59 has been activated, i.e. when the bowl 9 and the lid 33 have been positioned correctly. It is prevented thereby that a user of the kitchen machine can injure himself with the rotating coupling bush 19 when the bowl 9 has not been placed, or with the tool 27 rotating in the bowl 9 when the lid 33 has not been placed on the bowl 9.

FIG. 2 further shows a locking device 63 for locking the lid 33 during rotation of the tool 27. The locking device 63 is also arranged in the upper portion of the motor housing 5 and is provided with a centrifugal member 65 which is coupled to the vertically positioned motor shaft 23 of the electric motor 21.

Figure 3:
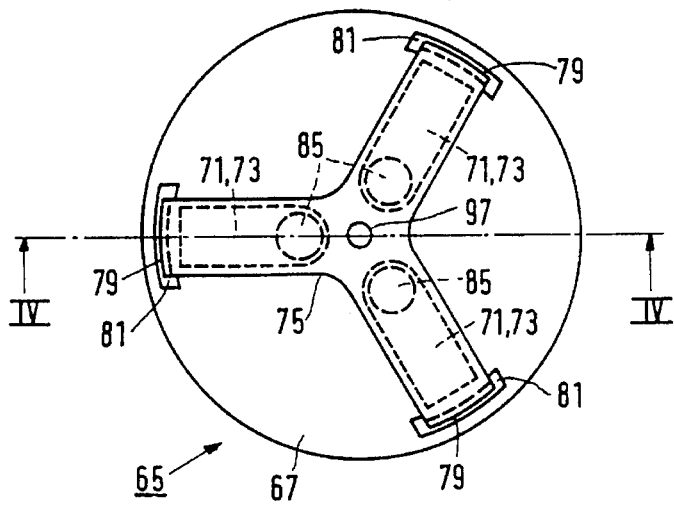
FIG. 3 is a plan view of a centrifugal member of the locking device of FIG. 2.
Figure 4:
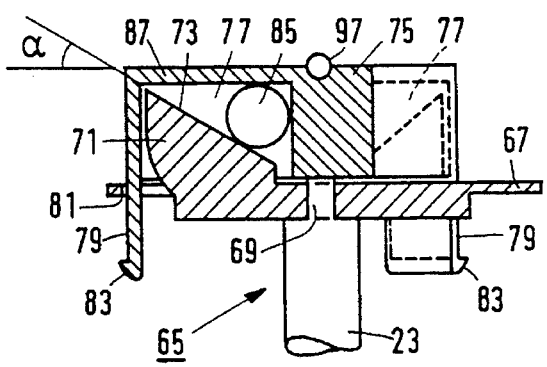
FIG. 4 is a cross-section of the centrifugal member taken on the line IV—IV in FIG. 3.

The centrifugal member 65 depicted in detail in FIGS. 3 and 4 comprises a disc-shaped metal base 67 which has been screwed onto an end 69 of the motor shaft 23 and which extends transversely to the motor shaft 23. Three support blocks 71 are present on the disc-shaped base 67, each extending in a radial direction relative to the motor shaft 23, which three radial directions enclose angles of 120° with one another. As is shown in FIG. 4, the support blocks 71 each have an upper surface 73 which rises from the motor shaft 23 in the radial direction, the upper surface 73 enclosing a positive angle of inclination α of approximately 30° with the disc-shaped base 67. The centrifugal member 65 also comprises a star-shaped synthetic-resin slide 75 which is provided with three chambers 77, each surrounding one of the support blocks 71. The chambers 77 can slide around the support blocks 71 in a direction parallel to the motor shaft 23 so that the slide 75 is displaced guided parallel to the motor shaft 23. Near the ends of the three chambers 77, the slide 75 is provided each time with a lip 79 which extends through a slot 81 in the disc-shaped base 67 and is provided with a rim 83 near a lower side. The rims 83 of the lips 79 form an abutment which defines a highest position of the slide 75.

As is shown in FIGS. 3 and 4, a metal ball 83 is present in each of the chambers 77 of the slide 75. The balls 85 rest on the upper surfaces 73 of the support blocks 71, while the slide 75 rests on the three balls 85 with the upper walls 87 of the chambers 77. When the motor shaft 23 is not rotating, the centrifugal member 65 is in a first position depicted in FIG. 5a, in which the balls 85 rest against the side walls 89 of the chambers 77 facing the motor shaft 23 under the influence of gravity, and the slide 75 is in a bottom position. When the electric motor 21 is switched on and the motor shaft 23 starts rotating, the balls 85 are taken along in rotation by the chambers 77, whereby the balls 85 in the chambers 77 experience a centrifugal force as a result of the rotation. Under the influence of the centrifugal force, the balls 85 are guided upwards in the chambers 77 along the upper surfaces 73 until they abut against the side walls 91 of the chambers 77 remote from the motor shaft 23. The centrifugal member 65 is then in a second position depicted in FIG. 5b in which the slide 75 resting on the balls 85 has been shifted upwards parallel to the motor shaft 23. When the electric motor 21 is switched off and the motor shaft 23 comes to a standstill, the balls 85 in the chambers 77 will roll down under the influence of gravity along the upper surfaces 73 until they hit against the side walls 89, and the slide 75 returns into its bottom position (see FIG. 5a).

As is shown in FIG. 2, the locking device 63 further comprises a substantially horizontal pivot arm 93 made of synthetic resin. Near one of its two ends, the pivot arm 93 is fastened to a coupling shaft 95 which is journalled in the upper portion of the motor housing 5 and extends transversely to the motor shaft 23. Near its other end, the pivot arm 93 rests on a metal support ball 97 which is present on the slide 75 between the chambers 77. The coupling shaft 95 is provided with a side arm 99 which has a pin 103 near its end 101 remote from the coupling shaft 95. The locking device 63 further comprises an elongate safety member 105 which extends in a direction transverse to the motor shaft 23 and to the coupling shaft 95 and which is guided with sliding possibility in said direction in the upper portion of the motor housing 5. The safety member 105 has a slot 107 which extends parallel to the motor shaft 23 and is in engagement with the pin 103 of the side arm 99. Furthermore, the safety member 105 comprises a detent 109 for cooperating with the vertical rim 53 of the lip 51 of the lid 33.

Figure 5A:
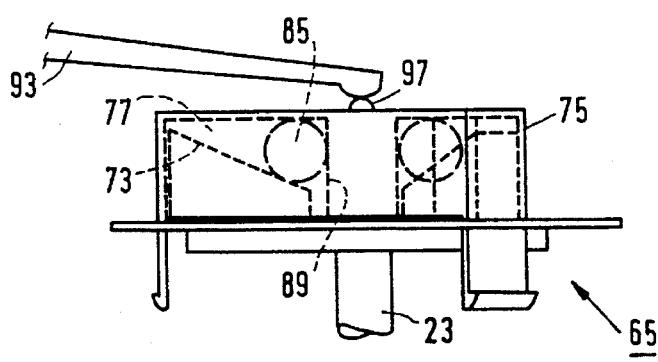
FIG. 5a is a side elevation of the centrifugal member of FIG. 3, with the centrifugal member in a first position.
Figure 5B:
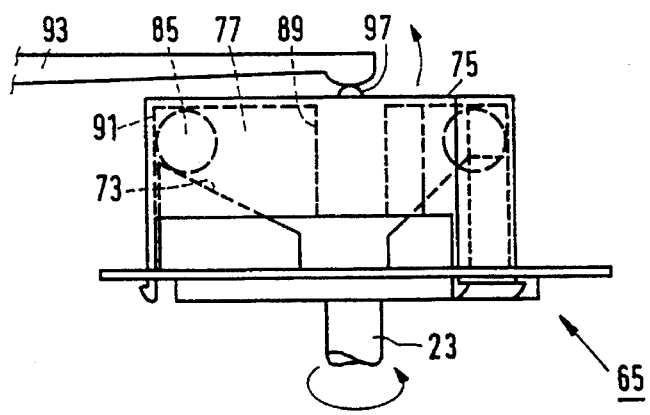
FIG. 5b is a side elevation of the centrifugal member of FIG. 3, with the centrifugal member in a second position, FIG. 6a diagrammatically shows an alternative centrifugal member, with the centrifugal member in a first position.

When the motor shaft 23 is not rotating and the centrifugal member 65 is in the first position shown in FIG. 5a, the pivot arm 93 rests on the support ball 97 of the slide 75 under the influence of gravity, and the safety member 105 and the detent 109 are in a position in which the vertical rim 53 of the lip 51 of the lid 33 can move freely past the detent 109. If the bowl 9 and the lid 33 have been positioned correctly, the switch 59 is activated by the vertical rim 53 and the electric motor 21 can be switched on with switches 61. The centrifugal member 65 is then moved from the first position into the second position shown in FIG. 5b under the influence of the rotation of the motor shaft 23, whereby the pivot arm 93 is rotated by the slide 75, and the safety member 105 and the detent 109 move into a position shown in FIG. 2 in which the detent 109 blocks the vertical rim 53. In this position of the detent 109, the lid 33 cannot be removed from the bowl 9 by rotation, and the bowl 9 with the lid 33 cannot be removed from the base 3. When the electric motor 21 is switched off, the electric motor 21 and the tool 27 driven by the electric motor 21 will continue to rotate during a short run-out period which is dependent on the mass inertia moments of the electric motor 21, the motor shaft 23, the transmission 25 and the tool 27 and by the friction experienced by said components. If only a small quantity of food to be processed is present in the bowl 9, the resistance of the tool 27 will be comparatively small and the run-out period may be several seconds. As long as the motor shaft 23 and the tool 27 coupled to the motor shaft 23 are rotating, the centrifugal member 65 will remain in the second position. The lid 33 is not released until the moment the motor shaft 23 is substantially stationary. It is prevented in this manner that a user of the kitchen machine can remove the lid 33 from the bowl 9 after switching-off of the electric motor 21 already during the run-out period of the tool 27 and can injure himself with the running-out tool 27.

Since the centrifugal member 65 is directly coupled to the high-speed motor shaft 23, the action of the locking device 63 is very effective. The speed with which the tool 27 rotates is considerably lower than the speed of the motor shaft 23 owing to the use of the transmission 25. Since the centrifugal member 65 does not return from the second position into the first position until at a comparatively low speed of the motor shaft 23, the lid 33 is only released when the speed of the tool 27 is substantially zero. In addition, the centrifugal force acting on the balls 85 of the centrifugal member 65 is great owing to the comparatively high speed of the motor shaft 23, so that a strong locking force is applied to the detent 109.

It is noted that the centrifugal member 65 is of a particularly simple construction. The disc-shaped base 67 and the support blocks 71 are manufactured from one piece of metal, while the slide 75 and the chambers 77 are made from one piece of synthetic resin. When the centrifugal member 65 is assembled, the balls 85 are laid in the chambers 77 and the base 67 is subsequently passed over the lips 79, whereby the slide 75 is locked relative to the base 67 because the rims 83 of the lips 79 hook behind the slots 81 of the base 67. Since the centrifugal member 65 is provided with three balls 85 guided along three support blocks 71 which enclose three mutual angles of substantially 120°, a regular distribution of the centrifugal forces around the motor shaft 23 is provided, so that the rotation of the centrifugal member 65 is substantially vibration-free. In addition, the three balls 85 exert a strong locking force on the detent 109.

The effectivity of the locking device 63 is determined inter alia by the value of the angle of inclination α. For a small value of the angle of inclination α, the critical speed of the motor shaft 23 at which the balls 85 roll from the first into the second or from the second into the first position is very low, but the displacement of the slide 75 and the locking force on the detent 109 are only small. When the angle of inclination α is comparatively great, a greater displacement of the slide 75 and a greater locking force on the detent 109 are indeed achieved, but the said critical speed is higher. The use of an angle of inclination α of approximately 30° leads to an optimum combination of critical speed and locking force. The lid 33 in that case is not released during the run-out of the tool 27 until the moment the tool 27 is substantially stationary, while the centrifugal member 65 exerts a force of approximately 20 kg on the pivot arm 93 at a speed of the motor shaft 23 of approximately 10000 rpm.

It is further noted that the locking device 63 comprises only two movable parts besides the centrifugal member 65, i.e. the coupling shaft 95 which is manufactured integrally with the pivot arm 93 and the side arm 99, and the safety member 105 which is also manufactured integrally with the detent 109 and the slot 107. The locking device 63 can accordingly be assembled in a simple manner. Owing to the small number of components, moreover, the friction between the components is small, so that the operation of the locking device, part of which takes place exclusively under the influence of gravity, is reliable. The friction between the pivot arm 93 and the slide 75 is negligibly small owing to the use of the support ball 97.

Figure 6A:
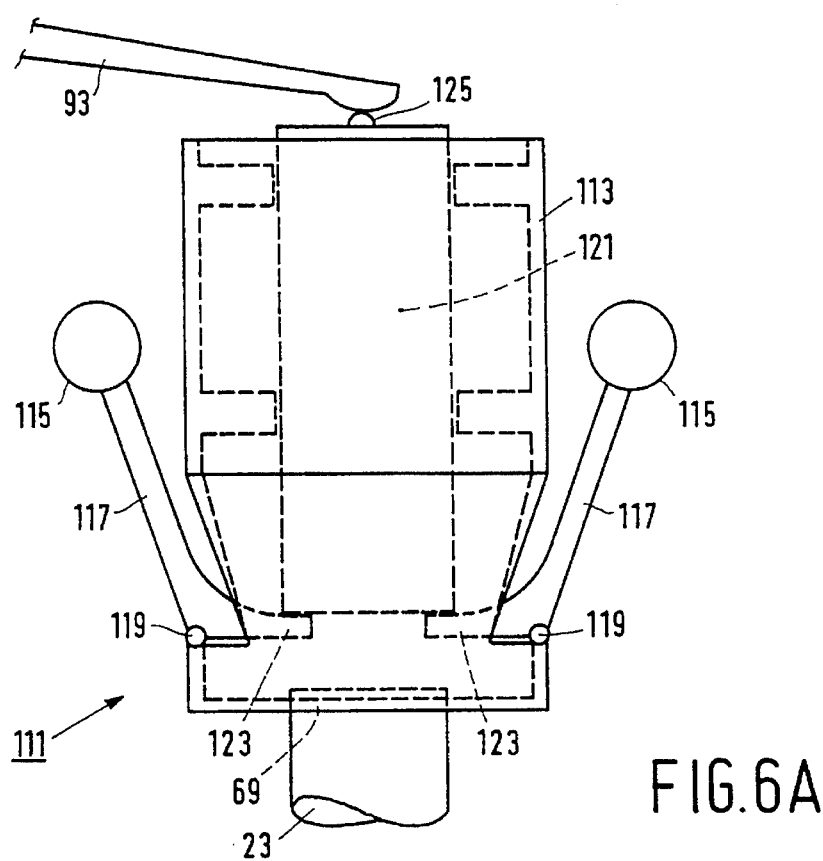
FIG. 6b shows the alternative centrifugal member of FIG. 6a, with the centrifugal member in a second position.
Figure 6B:
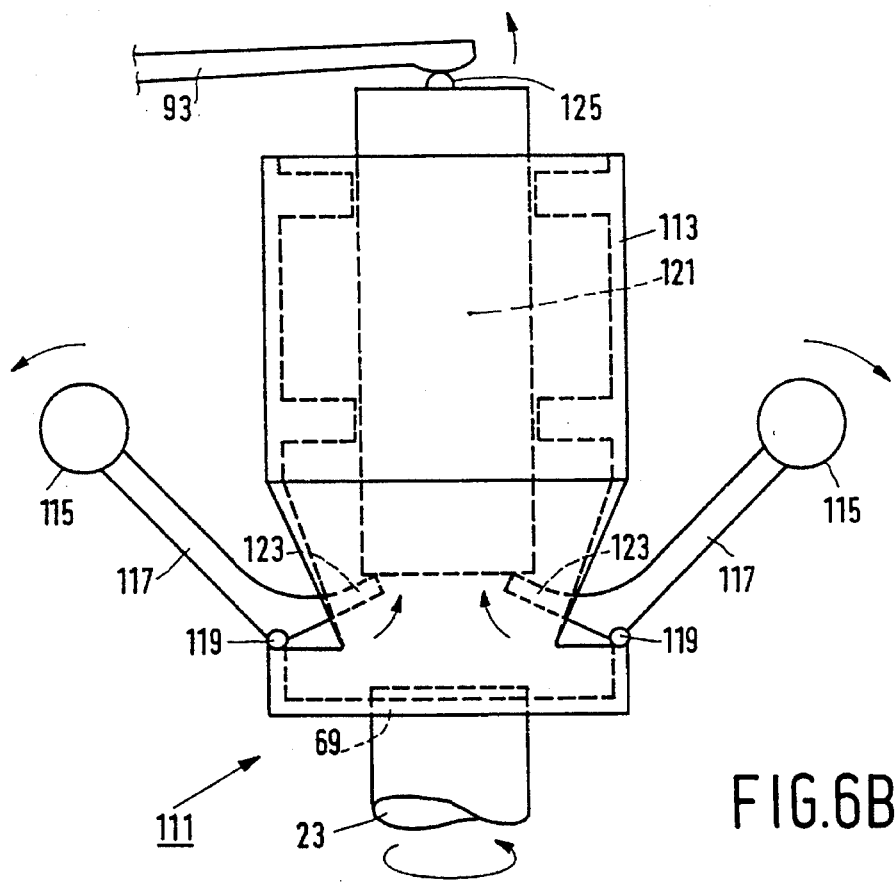

It is noted that a type of centrifugal member other than the centrifugal member 65 may be used such as, for example, the alternative centrifugal member 111 shown diagrammatically in FIGS. 6a and 6b. The centrifugal member 111 comprises a hollow shaft 113 which has been screwed onto the end 69 of the vertical motor shaft 23. The centrifugal member 111 further comprises two centrifugal weights 115 which are arranged diagonally opposite one another and are each fastened on an angled arm 117 which is pivotable relative to the hollow shaft 113 about a horizontal pivot 119. A further shaft 121 can slide in axial direction inside the hollow shaft 113. The further shaft 121 rests on the ends 123 of the angled arms 117 remote from the centrifugal weights 115. Furthermore, the pivot arm 93 mentioned above rests on a support ball 125 fastened on the further shaft 121.

When the motor shaft 23 is stationary, the centrifugal weights 115 are in a first position near the hollow shaft 113, as shown in FIG. 6a, under the influence of the weight of the further shaft 121 which rests on the angled arms 117 and of the pivot arm 93. When the motor shaft 123 starts rotating, the centrifugal weights 115 experience a centrifugal force owing to which the centrifugal weights 115 are displaced from the first position into the second position shown in FIG. 6b. The further shaft 121 and the pivot arm 93 are moved in vertical direction by the ends 123 of the angled arms 117, so that the safety member 105 (not shown in FIGS. 6a and 6b) coupled to the pivot arm 93 is operated.

It is further noted that the centrifugal member 65, 111 may be coupled to another shaft driven by the electric motor 21 instead of to the motor shaft 23. The centrifugal member 65, 111 may be coupled, for example, to a shaft arranged parallel to the motor shaft 23 and rotating at the same or a higher speed. If the operation of the centrifugal member used is not dependent on gravity, the centrifugal member may also be coupled to a drivable shaft which is in a horizontal position.

It is further noted that a different number of balls 85, for example two or four, may alternatively be used in the centrifugal member 65, and that the angle of inclination α in the centrifugal member 65 may have a value other than 30°. It is further noted that the locking device 63 cooperating with the centrifugal member 65 may comprise an alternative type of safety member.

It is finally noted that the locking device 63 described above with the centrifugal member 65 operates independently of the means for operating the electric motor 21, so that the locking device 63 is eminently suitable for the use in a kitchen machine provided with electronic contact switches 61 for operating the electric motor 21. The locking device according to the invention, however, may also be used in a kitchen machine provided with a mechanical switching button for operating the electric motor such as, for example, the kitchen machine disclosed in the European Patent 0 158 032 mentioned in the preamble.

I claim:

1. A kitchen machine with a housing and a bowl which can be placed on the housing and can be closed by means of a lid, while a rotatable tool can be placed in the bowl and driven by means of an electric motor arranged in the housing, the kitchen machine being provided with a locking device for locking the lid during rotation of the tool, characterized in that the locking device is provided with a centrifugal member which is rotatably coupled to a shaft which is drivable by the electric motor and which is movable from a first into a second position under the influence of a rotation of said drivable shaft, and with a safety member which cooperates with the lid and with the centrifugal member, the safety member releasing the lid in the first position of the centrifugal member and locking the lid in the second position of the centrifugal member.

2. A kitchen machine as claimed in claim 1, characterized in that the drivable shaft to which the centrifugal member is coupled is a motor shaft of the electric motor.

3. A kitchen machine as claimed in claim 1, characterized in that the drivable shaft extends in vertical direction, while the centrifugal member is provided with a ball which is guided by a guide fastened to the drivable shaft and extending obliquely relative to the drivable shaft with a positive angle of inclination, and is provided with a slide cooperating with the safety member, resting on the ball and guided so as to be displaceable parallel to the drivable shaft.

4. A kitchen machine as claimed in claim 3, characterized in that the centrifugal member comprises three balls which are each guided in an individual guide, while the guides enclose angles of substantially 120° with one another.

5. A kitchen machine as claimed in claim 4 wherein the angle of inclination of the guides is substantially 30°.

6. A kitchen machine as claimed in claim 4 wherein the locking device is provided with a pivot arm which near one of its two ends is fastened to a coupling shaft extending transversely to the drivable shaft and journalled in the housing and near its other end rests on the slide, while the safety member is displaceable in a direction transverse to the drivable shaft and transverse to the coupling shaft and is provided with a slot which extends parallel to the drivable shaft and is in engagement with a pin fastened on a side arm of the coupling shaft.

7. A kitchen machine as claimed in claim 3, characterized in that the angle of inclination of the guides is substantially 30°.

8. A kitchen machine as claimed in claim 7 wherein the locking device is provided with a pivot arm which near one of its two ends is fastened to a coupling shaft extending transversely to the drivable shaft and journalled in the housing and near its other end rests on the slide, while the safety member is displaceable in a direction transverse to the drivable shaft and transverse to the coupling shaft and is provided with a slot which extends parallel to the drivable shaft and is in engagement with a pin fastened on a side arm of the coupling shaft.

9. A kitchen machine as claimed in claim 3, characterized in that the locking device is provided with a pivot arm which near one of its two ends is fastened to a coupling shaft extending transversely to the drivable shaft and journalled in the housing and near its other end rests on the slide, while the safety member is displaceable in a direction transverse to the drivable shaft and transverse to the coupling shaft and is provided with a slot which extends parallel to the drivable shaft and is in engagement with a pin fastened on a side arm of the coupling shaft.

10. A kitchen machine as claimed in claim 6, characterized in that the pivot arm rests on a support ball of the slide.

11. A kitchen machine as claimed in claim 3 wherein the drivable shaft extends in vertical direction, while the centrifugal member is provided with a ball which is guided by a guide fastened to the drivable shaft and extending obliquely relative to the drivable shaft with a positive angle of inclination, and is provided with a slide cooperating with the safety member, resting on the ball and guided so as to be displaceable parallel to the drivable shaft.

* * * * *